US011885175B2

(12) United States Patent
Fleischmann

(10) Patent No.: US 11,885,175 B2
(45) Date of Patent: Jan. 30, 2024

(54) METHOD, SYSTEM AND APPARATUS FOR CONTROLLING EXCESSIVE GAPS OF A DOOR

(71) Applicant: National Guard Products, Inc., Memphis, TN (US)

(72) Inventor: Aron Fleischmann, Huxley, IA (US)

(73) Assignee: NATIONAL GUARD PRODUCTS, INC., Memphis, TN (US)

( * ) Notice: Subject to any disclaimer, the term of this patent is extended or adjusted under 35 U.S.C. 154(b) by 0 days.

(21) Appl. No.: 17/735,188

(22) Filed: May 3, 2022

(65) Prior Publication Data

US 2022/0349243 A1 Nov. 3, 2022

Related U.S. Application Data

(60) Provisional application No. 63/183,238, filed on May 3, 2021.

(51) Int. Cl.
*E06B 3/88* (2006.01)
*E06B 7/232* (2006.01)

(52) U.S. Cl.
CPC ................ *E06B 7/232* (2013.01); *E06B 3/88* (2013.01)

(58) Field of Classification Search
CPC ... E06B 7/232; E06B 3/88; E06B 7/18; E06B 1/70; E06B 3/365; E06B 2001/707; E06B 1/707; E06B 7/22; E04C 2/38
See application file for complete search history.

(56) References Cited

U.S. PATENT DOCUMENTS

| | | | | |
|---|---|---|---|---|
| 2,218,581 | A * | 10/1940 | Levan | A47H 19/00 16/42 T |
| 6,643,991 | B1 * | 11/2003 | Moyes | E06B 5/16 52/309.3 |
| 7,886,501 | B2 * | 2/2011 | Bartlett | E06B 3/88 52/800.1 |
| 9,518,422 | B2 * | 12/2016 | Noble, III | E06B 5/161 |
| 9,771,754 | B2 * | 9/2017 | Lewan | F25D 23/087 |
| 2002/0124497 | A1 * | 9/2002 | Fortin | E06B 5/164 52/784.11 |
| 2018/0251975 | A1 * | 9/2018 | Harber | E04B 2/763 |

* cited by examiner

*Primary Examiner* — Janet M Wilkens
*Assistant Examiner* — Susan M. Heschel
(74) *Attorney, Agent, or Firm* — K&L Gates LLP; Shu Chen

(57) ABSTRACT

A method and system configured to correct a non-compliant, excessive gap condition between a door and a frame, correct a non-compliant, excessive gap condition between a pair of doors at the meeting edge, correct a non-compliant, excessive gap condition at least using a formed metal edge and mechanical fasteners, and correct a non-compliant, excessive gap condition at least using a formed metal edge and mechanical fasteners, whereby the formed metal edge may vary in dimensions to accommodate uneven gaps.

16 Claims, 13 Drawing Sheets

METHOD, SYSTEM AND APPARATUS FOR CONTROLLING EXCESSIVE GAPS OF A DOOR

CROSS-REFERENCE TO RELATED APPLICATION

This application claims priority to U.S. Provisional Patent Application No. 63/183,238, filed May 3, 2021, the contents of which are herein incorporated by reference.

TECHNICAL FIELD

The present disclosure generally relates to a method, system and apparatus for controlling excessive gaps around the perimeter of a door, and more particularly relates to controlling and managing door edge clearance for fire-rated door assemblies.

BACKGROUND

Fire-rated doors may be generally constructed of materials that work together to slow or stop the spread of flames, smoke and, in certain applications, radiant and conductive heat transfer. Common materials of fire-rated doors may include wood, steel, fiberglass and fire-rated glass, or a combination of these materials. Structurally, a fire-rated door assembly may generally contain a frame, door(s), hardware, glazing, smoke seal gasket, and/or component parts. In application, fire-rated doors work in conjunction with surrounding passive fire protection systems to provide around-the-clock defense against fire and enable safe and unobstructed passage out of a building. When installed properly, the fire-rated doors will not combust or fail for the duration of their corresponding fire rating (in the average fire). Standard fire ratings vary, typically ranging from 20 to 180 minutes depending on code criteria. Fire-rated doors are required to be self-closing and positive latching, and must remain closed during a fire to protect the means of egress. Fire-rated door assemblies must comply with code requirements set forth by the National Fire Protection Association (NFPA), in particular, NFPA 101, Life Safety Code and NFPA 80, Standard for Fire Doors and Other Opening Protectives. These codes cover the installation, care and maintenance of many types of fire-rated doors and openings (i.e., assemblies). Specifically, NFPA 80 requires that all fire-rated door assemblies be inspected and tested annually. Facility managers may be responsible for ensuring that the annual inspection, testing, and record-keeping is performed. Any deficiencies must be corrected and documented, with follow-up acceptance by inspection and testing as per the authority having jurisdiction, in accordance with NFPA 80.

Generally, the inspection and testing may include the following 11 items: no open holes or breaks present on the surfaces of a fire-rated door assembly; glazing is intact and in place; doors, frames and hardware of the fire-rated door assembly are secured and in working order; parts are not missing or broken; door clearances are within required specifications; self-closing devices are operational; door coordinator (if installed) functions correctly; latching hardware secures the door when it is closed; auxiliary hardware does not interfere with the door or frame of the fire-rated door assembly; field modifications have not been made that void the label which indicates critical information about the original construction of the fire-rated door assembly, from its manufacturer and fire rating to whether it carries a temperature-rise rating; and gasketing and seals are in place, where required. Perimeter gaps in fire-rated door assemblies may refer to the distance between one edge of a fire-rated door and the door frame as measured from one side of the opening of the door (e.g., pull side). Door bottom gaps may refer to the distance between the bottom of the door and the finished floor.

In one example, NFPA 80 sets the maximum allowable perimeter gap to ⅛" for wood doors and ⅛"+/−1⁄16" for metal doors. Maximum allowable gap at the door bottom is ¾". These requirements relate to both single swing and double swing (pair) door conditions. Door gaps that exceed these maximum allowable tolerances result in a non-compliant fire-rated door assembly that needs to be corrected, inspected, and approved to maintain compliance. That is, proper gap tolerances ensure that a fire-rated door assembly will perform as it is intended. Gaps that are outside of tolerance can lead to compromised fire-rated door assembly integrity in a fire situation as well as not allowing the fire door latching mechanism to engage fully as it is required to do so by code.

One prior art reference U.S. Pat. No. 9,273,510 B2 generally relates to fire-rated door non-compliance issues due to excessive gaps. This patent solves this problem by using a door stop extension to cause a correction of a non-compliance of a pre-existing door system with NFPA 80. Specifically, the patent discloses the issues with fire-rated door assemblies having excessive clearance gaps between the edges of doors and the frames. Excessive clearance gaps reduce the effectiveness of the door stops that are integral to the frames. The greater the clearance between the door and the frame, the less the door stops are able to maintain the fire-rating of the door assembly. While this patent addresses the issue related to the excessive gap between the door and the frame, it does not address the excessive gap at the meeting edge between a pair of doors, often referred to as double swing doors.

Therefore, there is a need for controlling and managing door edge clearance(s) of various door assemblies (e.g., a single door, double swing doors or door frames) for fire safety purposes.

SUMMARY

Among other features, the present disclosure generally relates to a method, system and apparatus configured to provide a solution to control the clearance between an edge of a single door, a door and at least one adjacent door, or an edge of a door and a corresponding door frame. In one embodiment, the present disclosure may generally relate to a system or apparatus (e.g., at least one formed metal edge and means of attachment of the formed metal edge to door(s)) that may be applied to the edge of a wood or hollow metal (steel) door, or to a wood or hollow metal (steel) door frame, e.g., at some point in time after the door was originally installed (aftermarket), to control the gap (clearance) between two doors or a door and frame. Among other features, the present disclosure may be used to bring the gap (clearance) between an edge of a door and at least one adjacent door, or an edge of a door, or a corresponding door frame within the allowable gap (clearance) required by relevant regulation codes (e.g., between ⅛" to 3⁄16").

The above-simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTIONS OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
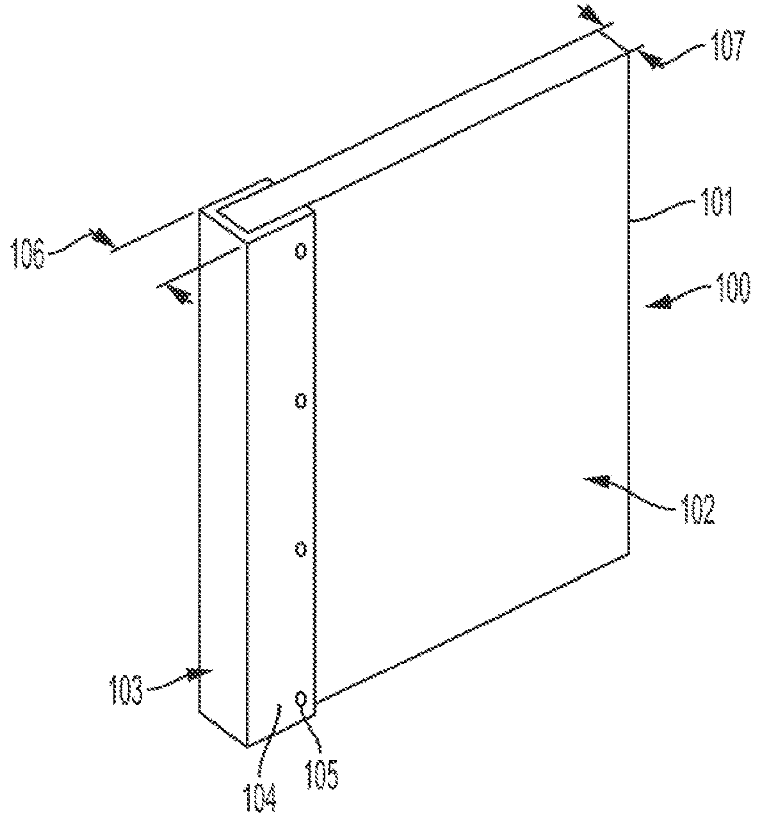
FIG. 1 illustrates a first prior art door assembly including a first formed metal edge.

Various aspects of the present disclosure will be described with reference to the drawings, wherein like reference numerals are used to refer to like elements throughout. In the following description, for purposes of explanation, numerous specific details are set forth in order to promote a thorough understanding of one or more aspects of the present application. It may be evident in some or all instances, however, that any aspects described below can be practiced without adopting the specific design details described below.

FIG. 1 shows that a first prior art door assembly 100 including a formed metal edge 103 which may be configured to wrap around at least one edge of a door 101 and the outer surface 104 of the formed metal edge 103 protrudes beyond the face 102 of the door 101. In one embodiment, the width dimension 106 of the formed metal edge 103 may be greater than the width 107 of the door 101. Multiple mechanical fasteners 105 or any suitable attachment means may be used to secure the formed metal edge 103 onto the door 101. In certain implementations, the formed metal edge 103 of assembly 100 may be configured to provide protection to the edge of the door 101 and also to a portion of the outer surface 102 of the door 101. For example, damage to the door 101 may include being hit with carts, hospital beds, etc. In using assembly 100, the door 101 may be protected and any damage may be received by the formed metal edge 103, and not the door 101. That said, the formed metal edge 103 of assembly 100 may require detailing and machining for door hardware (i.e., door latches, door handles, etc.), which may add complexity and opportunity for error. In addition, the formed metal edge portion 103 that lays on the outer surface 102 of the door 101 may be highly visible, and may be deemed unsightly. Generally, it may be preferable, especially with wood doors, to minimize the appearance of hardware on the outer surface of the door. In one example, upon installation of the formed metal edge 103 of assembly 100, in order to accommodate an uneven gap (clearance) at the top of the door 101 and the bottom of the door 101, the formed metal edge 103 may be installed at a slight angle. This slight installation angle may allow the gap (clearance) to be consistent from top to bottom along the edge of the door 101, and thus providing for a clean look, yet the formed metal edge 103 may be unsightly as it does not run consistently vertical, from top to bottom. Moreover, the formed metal edge 103 of assembly 100 may increase the thickness of the door 101 at the location of the installation, thereby creating issues in situations where a clearance between the face 102 of the door 101 and the stop of an adjacent frame is critical for the door's ability to close and latch properly. For example, increasing the thickness of the door 101 may have a negative impact on this clearance and add complexity and unnecessary work to remedy in order for the door 101 to operate properly. Furthermore, the fasteners 105 of assembly 100 may be installed to be visible on the face 102 of the door 101 which may be deemed unsightly, and provide for a cold and institutional appearance.

Figure 2:
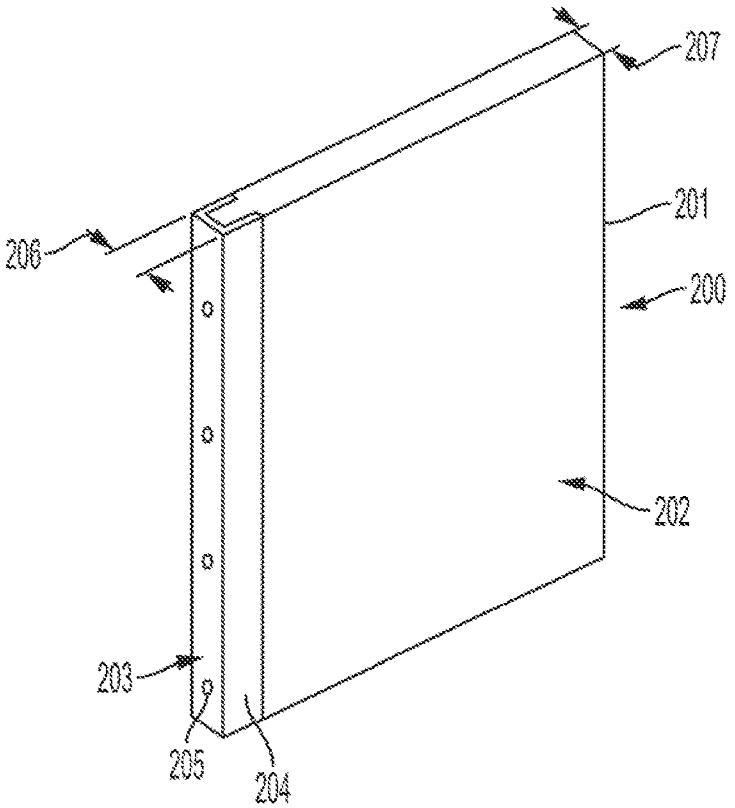
FIG. 2 illustrates a second prior art door assembly including a second formed metal edge.

FIG. 2 shows that a second prior art door assembly 200 including a formed metal channel 203 which wraps around at least one edge of a door 201 and the outer surface 204 of the formed metal edge 203 is co-planar with the outer surface 202 of the door 201. The width dimension 206 of the formed metal edge 203 may be configured to be equal to the width 207 of the door 201. One or more mechanical fasteners 205 or any suitable attachment means may be used to secure the formed metal edge 203 onto the door 201.

In one embodiment, the formed metal edge 203 of assembly 200 may be configured to provide protection to the edge of the door 201 and also to a portion of the outer surface 202 of the door 201, such that damage (e.g., door being hit with carts, hospital beds, etc.) may be received by the formed metal edge 203, not the door 201. Another advantage of assembly 200 is that the outside face of the formed metal edge 203 is co-planar with the face 202 of the door 201 and does not increase the thickness of the door 201 at the location of installation. In fact, the door 201 may be machined (remove material) to receive the formed metal edge 203. However, such adjustment of the door 201 may be carried out at a factory or off-site and not be readily done on a jobsite, which creates complexity and opportunity for error and scheduling issues. Further, the formed metal edge portion 203 that lays on the outer surface 202 of the door 201 may be highly visible, and may be deemed unsightly. Generally, it may be preferable, especially with wood doors, to minimize the appearance of hardware on the outer surfaces of the door. In some implementations, upon installation of the formed metal edge 203 of assembly 200, in order to accommodate an uneven gap (clearance) at the top of the door 201 and the bottom of the door 201, the formed metal edge 203 may be installed at a slight angle. This slight installation angle may allow the gap (clearance) to be consistent from top to bottom, and thus providing for a clean look, yet the formed metal edge 203 may be unsightly as it does not run consistently vertical, from top to bottom.

Figure 3:
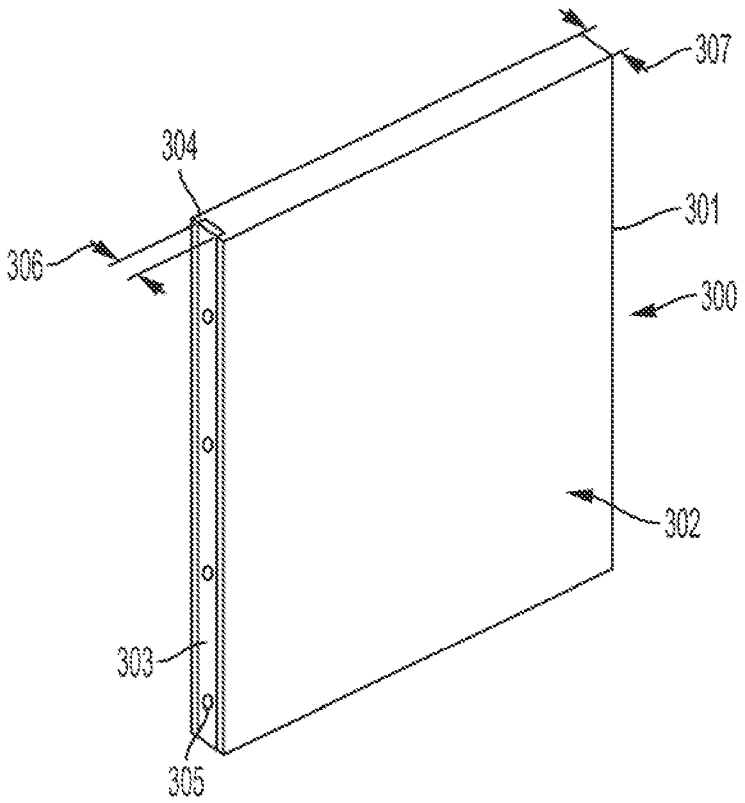
FIG. 3 illustrates a third prior art door assembly including a metal edge.

FIG. 3 shows that a third prior art door assembly 300 including a metal edge 303 which inlays into at least one edge 304 of a door 301 is co-planar with the edge 304 of the door 301. In one embodiment, the width dimension 306 of the metal edge 303 may be less than the width dimension 307 of the door 301. One or more mechanical fasteners 305 or any suitable attachment means may be used to secure the metal edge 303 onto the door 301. The metal edge 303 of assembly 300 may be invisible from certain perspectives (e.g., when one is looking at the face of the door), thereby providing a clean appearance. Similarly, the fasteners 305 of assembly 300 may be invisible when viewing from the perspective of the face of the door, providing a clean appearance. However, the door 301 may be machined (remove material) to receive the metal edge 303. Generally, such adjustment of the door 301 may be carried out at a factory or off-site and not be readily done on a jobsite, which creates complexity and opportunity for error and scheduling issues. In addition, such machining may be performed on wood doors and therefore this type of metal edge 303 may not be used on hollow metal (steel) doors. Moreover, the metal edge 303 of FIG. 3 may be used to control a gap (clearance) between doors, but the metal edge 303 may protrude outwardly from the edge 304 of the door 301, potentially resulting in a sharp corner on the metal edge 303 which may extend from top to bottom of the door 301.

As will be described fully below with respect to FIGS. 4-15, the present disclosure may relate to a system or apparatus including at least one formed metal edge, means of attachment of the at least one formed metal edge to a selected edge of a door (e.g., via mechanical fasteners or any suitable attachment methods) and fire-rated caulk. In one embodiment, the formed metal edge of the present disclosure may include two outermost sides (tabs) bent to an initially specified angle and a central portion. The central portion may contain punched holes to receive mechanical fasteners or any other suitable attachment means. In one aspect, the formed metal edge may be configured to provide an initial height or thickness dimension and an initial width dimension, both may be a function of the initial angle of the outermost sides (tabs). In one preferred embodiment, the length of the formed metal edge may be equal in length to the location on the door to which it is being applied. For example, if the gap (clearance) being controlled by the apparatus of the present disclosure is along a vertical edge of the door, then the length of the formed metal edge may be determined to extend the same length as the vertical edge of the door. Likewise, if the gap (clearance) being controlled by the apparatus is along a top edge of the door, then the length of the formed metal edge may be determined to extend the same length as the top of the door.

Among other features, the apparatus of the present disclosure may be configured to control the gap (clearance) along the perimeter of a door, while also providing a method of securement to a fire-rated door. The formed metal edge of the present disclosure may be modified or adjusted upon installation to accommodate for an uneven gap (clearance) along the perimeter of the door. Such modification may occur during installation and may include additional forming of the formed metal edge, using a block of wood and mallet for example, by reducing the height or thickness dimension to a selected parameter to control the gap (clearance) which simultaneously increases the width dimension of the formed metal edge across the edge of the door. The additional forming of the formed metal edge during installation provides a solution that may control a gap (clearance) that varies in dimension along the edge of a door.

Moreover, the method of securement may be critical to the performance of the apparatus of the present disclosure. While the method of securement is very similar between a wood door and a hollow metal (steel) door, the specific method of securement may be determined based upon a door construction. For example, due to the construction of fire-rated wood doors, the method of securement may be more involved than that of the hollow metal (steel) doors. In certain implementations, a method of securement for the formed metal edge to the edge of a fire-rated wood door may include using machined bore(s), fire rated caulk, and one or more mechanical fasteners. In accordance with aspects of the present disclosure, an example method of securement to a hollow metal (steel) door may simply include the fire rated caulk and mechanical fasteners.

In an alternative embodiment, the present disclosure may relate to a flat (non-formed) metal edge having a constant thickness along the length to control the gap (clearance) of a door. Since no variation in thickness may be provided, the control of the gap (clearance) using such a flat (non-formed) metal edge may be limited to the thickness of the flat (non-formed) metal edge. Using this approach, when gaps (clearances) of varying thicknesses may be encountered, multiple flat metal edges may be stacked at varying locations along the length of the gap (clearance) to achieve the same end result of the aforementioned formed metal edge of the present disclosure.

In yet another embodiment, the present disclosure may exclude the use of the fire-rated caulk. Generally, fire-rated caulk may provide a structural element to an apparatus, thereby providing for a balance between the length of mechanical fasteners required (primarily on wood doors) and conflicts with existing hardware on the door. For example, if one or more machined bores with fire-rated caulk are not implemented, a longer mechanical fastener may be used to accomplish the same end result of securement of the formed metal edge to the door. However, using longer mechanical fasters may create a physical interference with the existing hardware. For example, the mechanical fasteners may have an extended length and may not able to be fully driven into the edge of a door, resulting in a compromised structural integrity of the method of securement.

Figure 4:
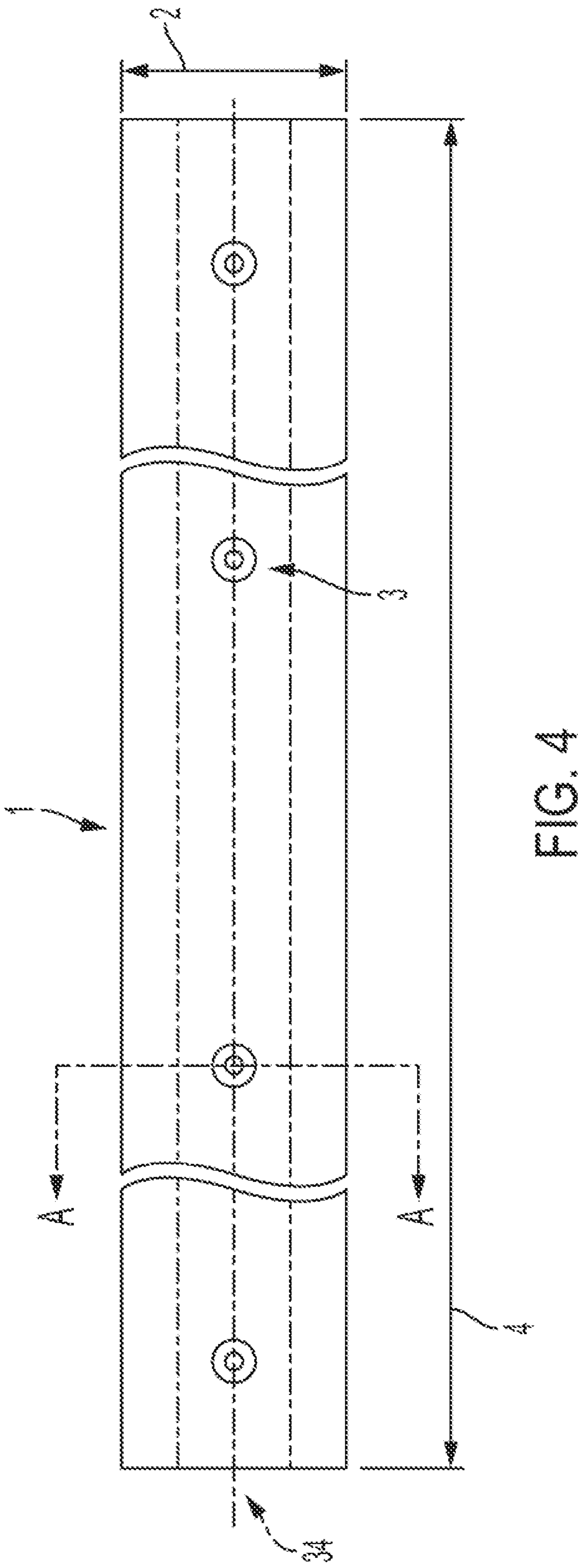
FIG. 4 illustrates a planar view of an example formed metal edge, according to an exemplary aspect of the present disclosure.
Figure 8:
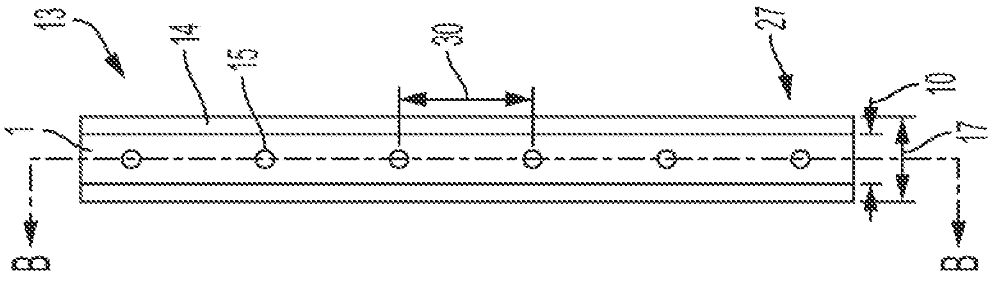
FIG. 8 illustrates a first side view of a door fitted with the formed metal edge of FIG. 4, according to an exemplary aspect of the present disclosure.
Figure 13:
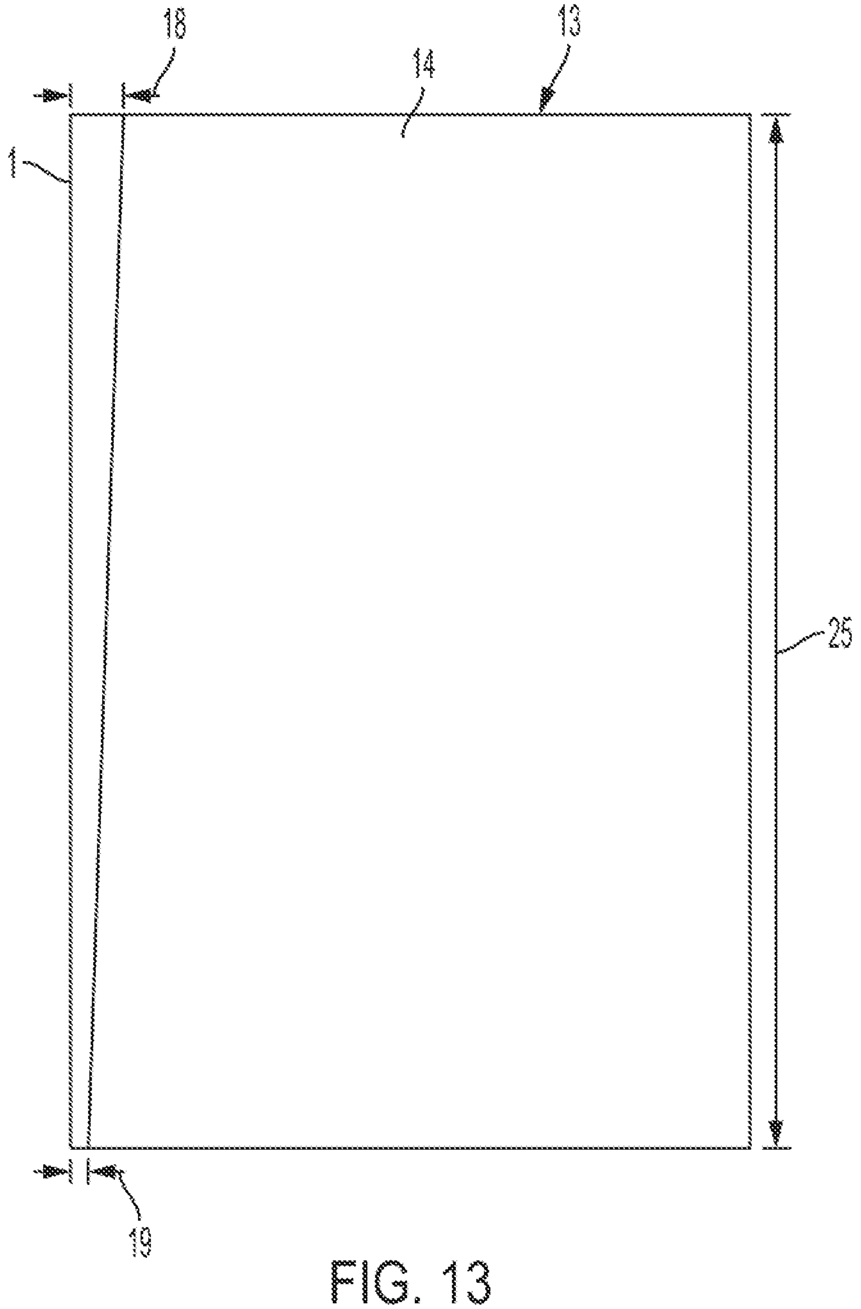
FIG. 13 illustrates uneven gaps or clearance between a door and a door frame.

FIG. 4 illustrates a planar view of a formed metal edge 1 which may be symmetrical about a centerline 34 which may run the longitudinal length 4 of the formed metal edge 1, in accordance with aspects of the present disclosure. One or more formed holes 3 may be placed along the centerline 34, located at a selected spacing and serve to receive one or more mechanical fasteners. In one embodiment, the length dimension 4 may be manufactured to a length consistent with the most common heights 25 of the fire-rated door 13, as shown in FIG. 13. For example, referring to FIG. 15, if the height 25 of a fire-rated door 13 to be repaired using the present disclosure measures 84", the length 4 of the formed metal edge 1 may be supplied at a dimension of 84". In another embodiment, if the dimension for the height 25 of the fire-rated door 13 measures 96", the length 4 of the formed metal edge 1 may be supplied at a dimension of 96". The width dimension 2 of the formed metal edge 1 may be configured to vary based on a specific application, and a preferred range may be between 1.50" and 1.75", not to exceed the thickness dimension 17 of the door 13, as shown in FIG. 8.

Figure 5A:
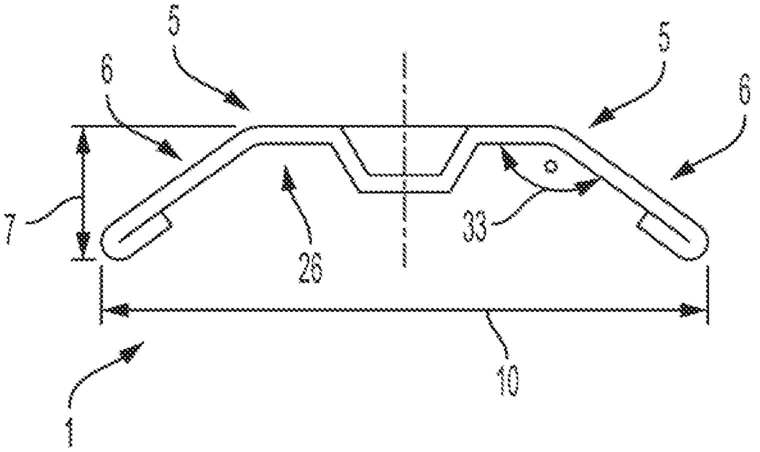
FIG. 5A illustrates a first side view of the formed metal edge of FIG. 4 taken at section AA, according to an exemplary aspect of the present disclosure.
Figure 6A:
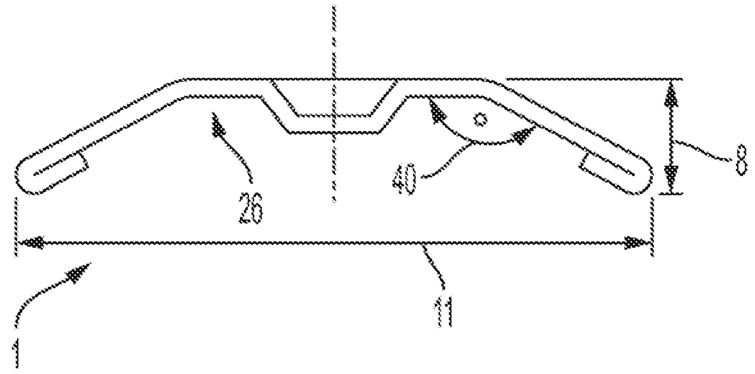
FIG. 6A illustrates a third side view of the formed metal edge of FIG. 4 taken at section AA, according to an exemplary aspect of the present disclosure.
Figure 7A:
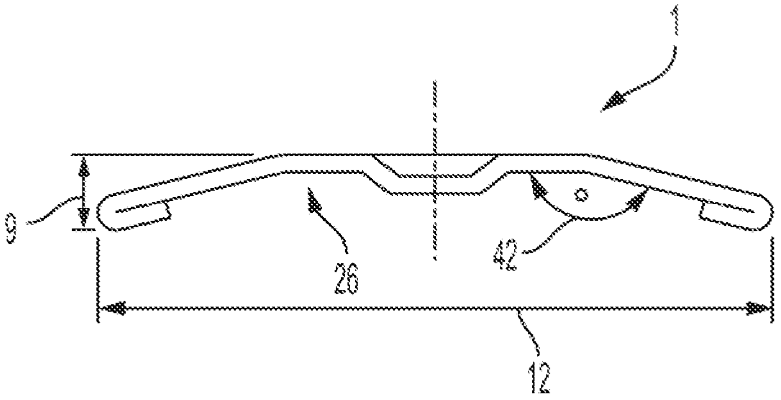
FIG. 7A illustrates a fifth side view of the formed metal edge of FIG. 4 taken at section AA, according to an exemplary aspect of the present disclosure.

In one embodiment, the formed metal edge 1, as shown in a side view of FIG. 5A, may include two bend locations 5 which provide for respective tabs 6. The angle 33 of the bend 5 may be configured to control the overall height dimension 7 as well as the overall width dimension 10 of the formed metal edge 1, respectively. For example, as the angle 33 of the bend 5 increases, the overall height dimension 7 may decrease while the overall width dimension 10 may increase, respectively. This relationship is further illustrated in FIGS. 6A and 7A. For example, when fitting the formed metal edge 1 to the fire-rated door 13, the angle 33, width 10 and height 7 dimensions may be configured to vary along the length 4 of the formed metal edge 1 with respect to the height 25 of the fire-rated door 13. Using a block of wood placed onto the formed metal edge 1, along with contact onto the wood block by a swinging mallet, the angle 33, width 10 and height 7 dimensions may be modified to satisfy the dimensional requirements at particular locations along the height 25 of the fire rated door 13, as shown in FIG. 13. To further illustrate, one embodiment may include a pair of fire-rated doors 13 with a gap that measures ⅜" between the tops of the doors (¼" excessive gap) and a gap that measures $\frac{3}{16}$" ($\frac{1}{16}$" excessive gap) at the bottom of the doors. To correct such excessive gap condition, one may first apply the formed metal edge 1 at the top of the door 13, where thickness dimension 7 may measure 0.25" and width dimension 10 may measure 1.50". Thereafter, via e.g., a block of wood and mallet or any suitable approach, the dimensions (the angle, width and height) of the formed metal edge 1 may be modified in progression toward the bottom of the door 13. FIG. 6A may represent the half-way point of the door height where the angle 40 of each bend location increases, the height dimension 8 of the formed metal edge 1 may need to be measured 0.16", and the width dimension may measure 1.56". Continuing to use e.g., the wood block and mallet to modify the dimensions of the formed metal edge 1 in progression toward the bottom of the door 13, FIG. 7A illustrates the dimensions at the bottom of the door 13. The angle 42 of each bend location further increases, thickness dimension 9 may measure 0.06" and width dimension 12 may measure 1.62". This embodiment describes the method of using the present disclosure to correct a gap that varies in dimension along the height 25 of a pair of fire rated doors 13.

Figure 6B:
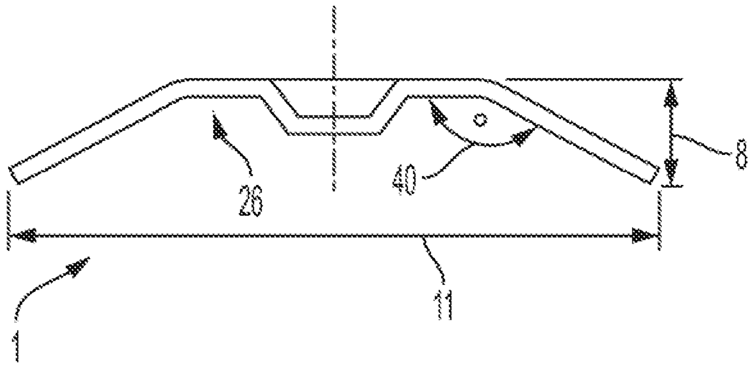
FIG. 6B illustrates a fourth side view of the formed metal edge of FIG. 4 taken at section AA with a different edge configuration, according to an exemplary aspect of the present disclosure.
Figure 7B:
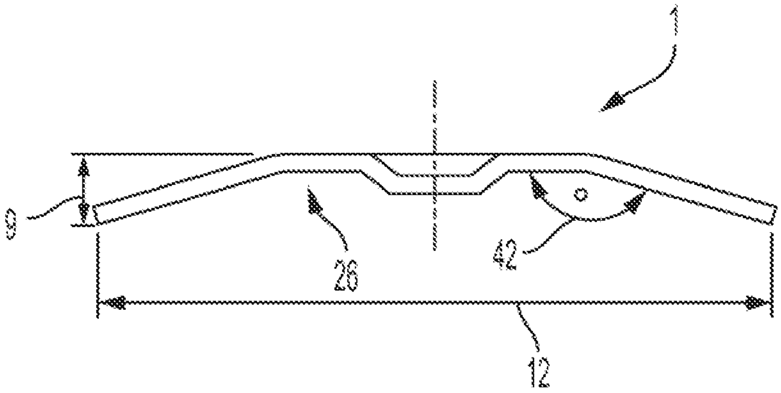
FIG. 7B illustrates a sixth side view of the formed metal edge of FIG. 4 taken at section AA with a different edge configuration, according to an exemplary aspect of the present disclosure.

It should be appreciated that, although the formed metal edge 1 shown in FIGS. 5A, 6A and 7A may be configured to have flattened hems (an edge of sheet metal that is bent 180 degrees and flattened on top of itself), different edge configurations (e.g., rope hems, open hems, teardrop hems) may be used based on specific applications of the formed metal edge of the present disclosure to conceal a sharp edge or a burr for safety reasons, to provide added strength, or to achieve a smooth aesthetic appearance. Generally, hem bends may add rigidity to the edge of the formed metal edge 1 which may be useful in long sections of a sheet metal part that may be unstable during use, rather than a bare single-layer edge as shown in FIGS. 5B, 6B and 7B.

Figure 5B:
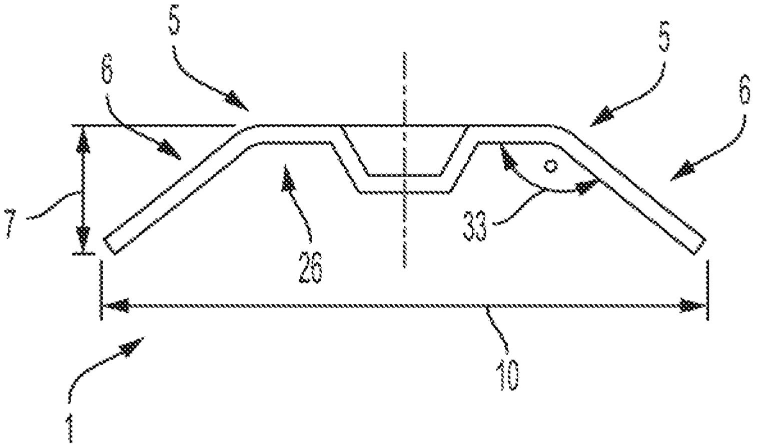
FIG. 5B illustrates a second side view of the formed metal edge of FIG. 4 taken at section AA with a different edge configuration, according to an exemplary aspect of the present disclosure.

In accordance with important aspects, the formed metal edge 1 of the present disclosure may be generally U-shaped including a horizontal portion and two legs (tabs 6) connected to the horizontal portion at an angle at either side (e.g., angle 33 and bend locations 5 as shown in FIGS. 5A and 5B). The horizontal portion may include a central portion configured to receive mechanical fasteners and the two tabs 6 may be bent up and down, stretched outward or pushed inward to change the overall shape and dimension of the formed metal edge 1. In some embodiments, the formed metal edge 1 may be manufactured or modified during use to change the initial angle of the two outermost legs/side (tabs 6) to fit with doors having different widths and configurations. As shown in FIGS. 5A, 5B, 6A, 6B, 7A and 7B, when fitted with a door, the formed metal edge 1 may provide a space or portion 26 between its structure and the edge of the door for accommodating e.g., fire-rated caulk.

Referring to FIG. 8, the relationship of the width dimension 10 of the formed metal edge 1 relative to the door thickness dimension 17 is an important feature of this present disclosure. The width dimension 10 of the formed metal edge 1 may be less than or equal to the door thickness dimension 17, such that the formed metal edge 1 does not extend beyond the face 14 of the fire-rated door 13 when viewed from the perspective of the door as shown in FIG. 8. In one embodiment, the door thickness dimension 17 may measure 1.75", which is the most common among commercial and industrial fire-rated doors that are required to meet the gap compliance code measurements. When the centerline of 34 of the formed metal edge 1, as shown in FIG. 4, is aligned with the centerline of the door 13 on the face 14, an equal amount of door edge may be visible on either side of the formed metal edge 1. As described above, the formed metal edge 1 may be configured to control excessive gap along a door edge at different portions. For example, the formed metal edge 1 may be applied to the top portion of the door 13 to correct a first excessive gap by setting the height or thickness dimension of the formed metal edge 1 to be 0.25", and the width dimension 1.50", which is less than the door thickness dimension 17 of 1.75". Progressing to the bottom of the door 13, the formed metal edge 1 may correct a second, different excessive gap by setting the height or thickness dimension to be 0.06", and the width dimension 1.62", which is less than the door thickness dimension 17 of 1.75". As a result, the formed metal edge 1 may be configured to correct excessive gaps along the edge of the door 13 without protruding beyond the face 14 of the fire rated door 13. Furthermore, a plurality of formed holes may be placed along the entire centerline of the formed metal edge 1 with spacing 30 between adjacent holes, preferably of a dimension of 8".

Figure 9:
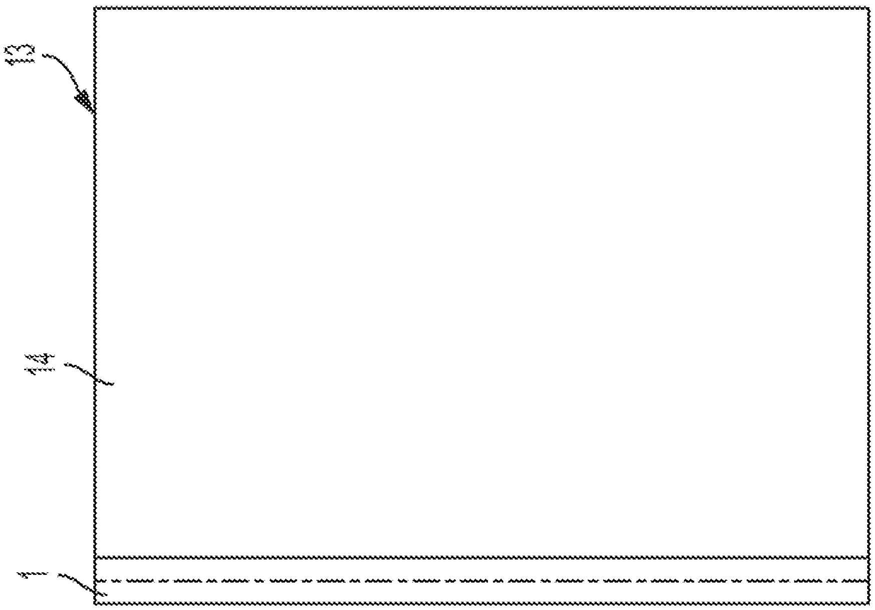
FIG. 9 illustrates a second side view of a door fitted with the formed metal edge of FIG. 4, according to an exemplary aspect of the present disclosure.

FIG. 9 further illustrates the relationship between the formed metal edge 1 placement with respect to the face 14 of a fire-rated door 13.

Figure 10B:
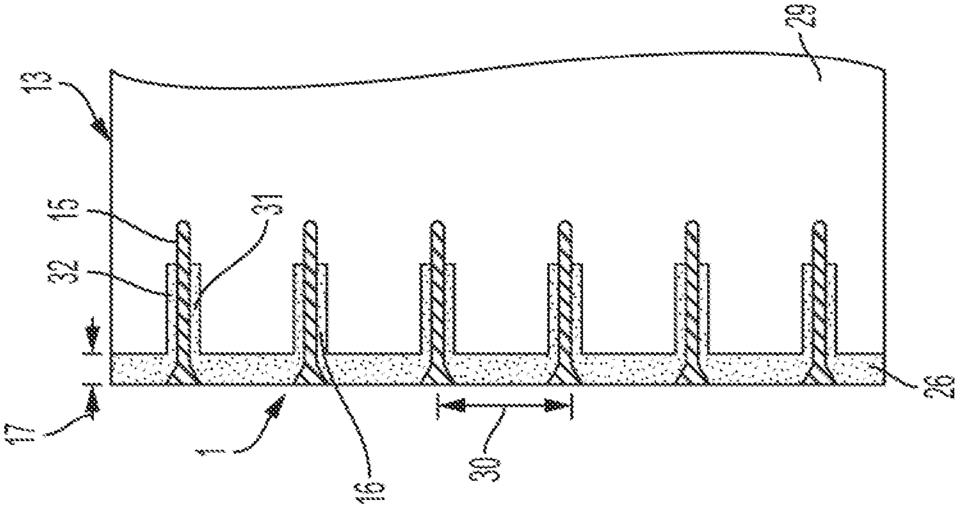
FIG. 10B illustrates a second side view of FIG. 8 taken at section BB and including fire-rated caulk, according to an exemplary aspect of the present disclosure.
Figure 10A:
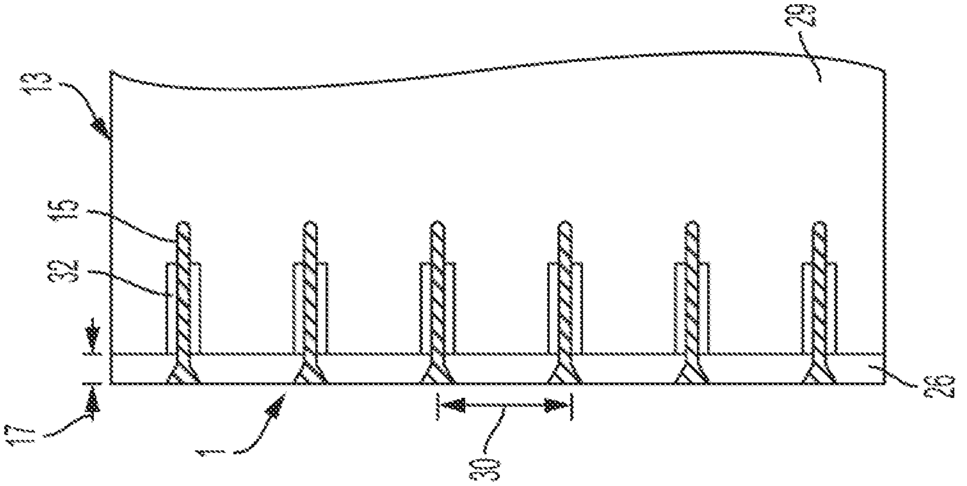
FIG. 10A illustrates a first side view of FIG. 8 taken at section BB, according to an exemplary aspect of the present disclosure.

FIGS. 10A and 10B illustrate an example anchoring system of a preferred embodiment of a wood type fire rated door 13 without and with fire-rated caulk, respectively, in accordance with aspects of the present disclosure. Specifically, a first anchoring system, as shown in FIG. 10A, may use a plurality of machined bores 32 and mechanical fasteners 15 to secure the formed metal edge 1 of the present disclosure to the wood type fire rated door 13, and a second anchoring system, as shown in FIG. 10B, may use a plurality of machined bores 32, fire-rated caulk 31 and mechanical fasteners 15 to secure the formed metal edge 1 to the wood type fire rated door 13. FIGS. 8, 10A, and 10B illustrate that such an anchoring system may include a plurality of bores 32 with a spacing 30 between adjacent bores, preferably of a dimension of 8". In one embodiment, the anchoring system may carried out by first drilling a machined bore 32 which has a diameter of 0.5" and a length of 1.50", with a repeating linear pattern about the centerline of the edge of the door, consistent with spacing 30 at a dimension of 8", along the height of the wood type fire rated door 13. After drilling of the plurality of machined bores 32, as shown in FIG. 10B, each bore may be filled with fire-rated caulk 31. Next, additional fire rated caulk 16 may be applied to the concave side 26 of the formed metal edge 1, as shown in FIG. 11B, along the entire length of the formed metal edge 1. Next, the centerline of the formed metal edge 1 containing fire-rated caulk 16 may be placed along the centerline of the edge of the door 13, concentrically aligning the formed holes 3 of the formed metal edge 1, as shown in FIG. 4, with the machined bore 32. It is worth noting that the fire-rated caulk 31 and fire-rated caulk 16 are each in the uncured state during this step of the process. Finally, one of the mechanical fasteners 15 may be inserted first through the formed hole 3 of the formed metal edge 1, as shown in FIG. 4, then through a corresponding machined bore 32 filled with fire-rated caulk 31, and lastly into the structural door material 29 of door 13. In one preferred embodiment, the mechanical fastener 15 may include a #10×2.50" stainless steel screw. The 2.50" length of the mechanical fastener is longer than the 1.50" length of the machined bore 32, providing for screw thread engagement into the structural door material 29. The process of using the mechanical fastener 15 may be repeated along the length 4 of the formed metal edge 1, consistent with spacing 30 along the height of the wood type fire rated door 13. It is worth noting that, as shown in FIG. 10B, the process of using each mechanical fastener 15 may be performed while the fire-rated caulk 31 and 16 are in the uncured state, to secure the formed metal edge 1 to the wood type fire rated door 13. Upon full curing of the fire-rated caulk 31 and 16, the anchoring system is complete and provides for structural integrity between the formed metal edge 1, the machined bores 32, mechanical fasteners 15 and the structural door material 29, along the height of the wood type fire rated door 13.

In an alternative embodiment, the present disclosure may be applied to a hollow metal (steel) fire rated door. Specifically, the machined bores 32 may not be necessary, and therefore the anchoring system may comprise fire rated caulk 16 applied to the concave side 26 of the formed metal edge 1 along with the mechanical fasteners 15. Due to the material and construction of the hollow metal (steel) fire rated door 13, the preferred mechanical fastener may include a #10×0.75" self-drilling stainless steel screw.

Figure 11A:
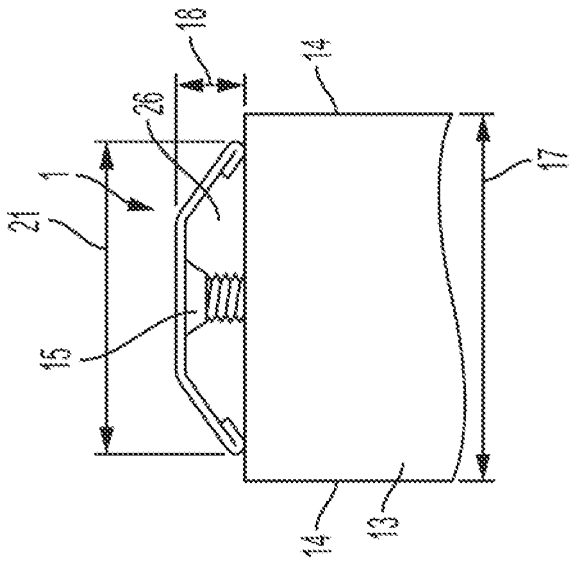
FIG. 11A illustrates a first side view of a first location on an edge of a door fitted with the formed metal edge of FIG. 4, according to an exemplary aspect of the present disclosure.
Figure 11B:
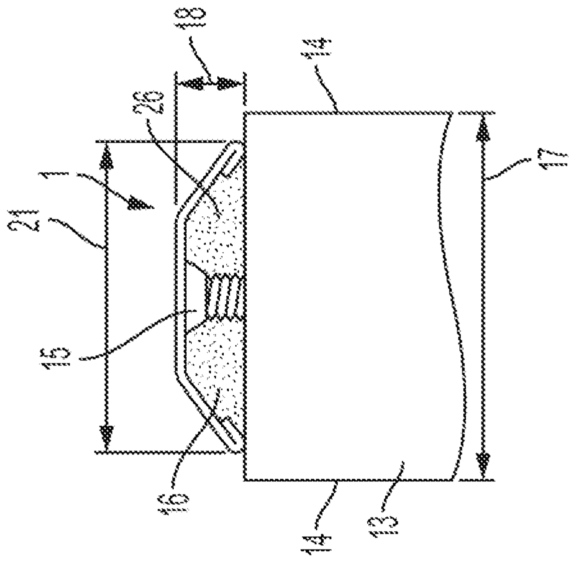
FIG. 11B illustrates a second side view of a first location on an edge of a door fitted with the formed metal edge of FIG. 4 including fire-rated caulk, according to an exemplary aspect of the present disclosure.
Figure 12B:
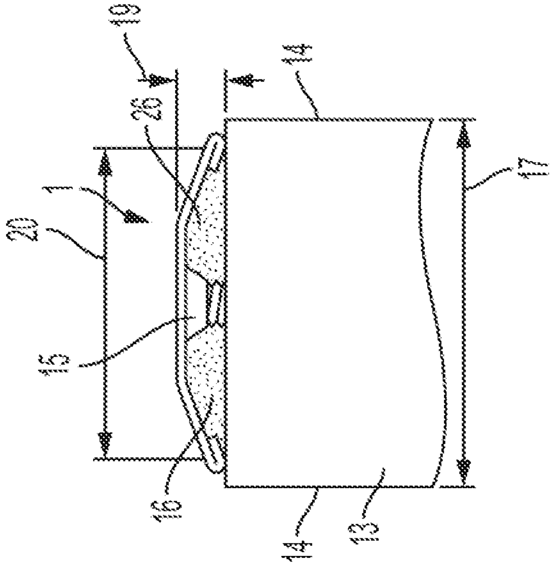
FIG. 12B illustrates a second side view of a second location on an edge of a door fitted with the formed metal edge of FIG. 4 including fire-rated caulk, according to an exemplary aspect of the present disclosure.
Figure 12A:
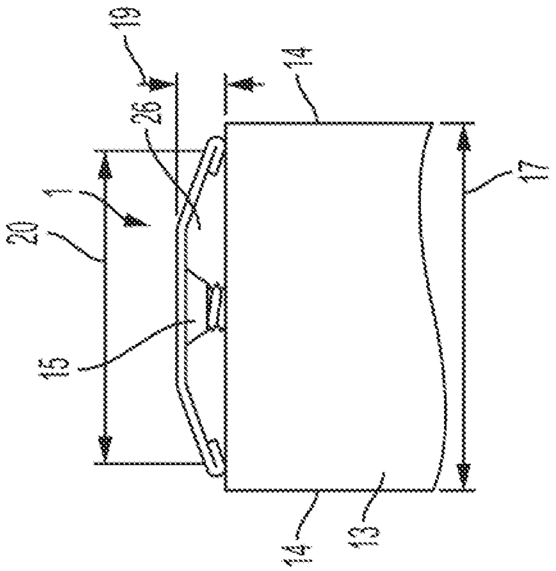
FIG. 12A illustrates a first side view of a second location on an edge of a door fitted with the formed metal edge of FIG. 4, according to an exemplary aspect of the present disclosure.

FIGS. 11A, 11B, 12A and 12B demonstrate the concave portion 26 of the formed metal edge 1 and the location of the fire-rated caulk 16. FIG. 13 demonstrates the variation of a gap between a fire rated door 13 and a door frame to the left edge of the door 13 (not shown), along the height 25 of a fire-rated door 13, wherein the fire-rated door 13 may be a single door (commonly referred to as a single swing, or a side-hinged swinging door). Specifically, FIGS. 11A and 11B represent the application of the formed metal edge 1 at the top of the fire rated door 13 of FIG. 13 without and with fire caulk filled the concave portion 26 of the formed metal edge 1. FIGS. 12A and 12B represent the application of the formed metal edge 1 at the bottom of the fire rated door of FIG. 13 without and with fire caulk the concave portion 26 of the formed metal edge 1. In this embodiment as shown in FIG. 13, the height or thickness dimension 18 of the formed metal edge 1 may be greater than its height or thickness dimension 19 near the bottom portion of the door 13, demonstrating the varying dimensions of the formed metal edge 1 after having been modified as previously described, to accommodate this variance. Referring to FIGS. 11A and 11B, the height or thickness dimension 18 and width dimension 21 of the formed metal edge 1 may ensure that the formed metal edge 1 does not protrude beyond either face 14 of the fire rated door 13. For example, thickness dimension 18 may measure 0.25" and width dimension 21 may measure 1.50", which is less than the door thickness 17 of 1.75". Likewise, FIGS. 12A and 12B demonstrate that the height or thickness dimension 19 and width dimension 20 of the formed metal edge 1 may ensure that the formed metal edge 1 does not protrude beyond either face 14 of the fire rated door 13. For example, thickness dimension 19 may measure 0.06" and width dimension 20 may measure 1.62", which is less than the door thickness 17 of 1.75".

Figure 14:
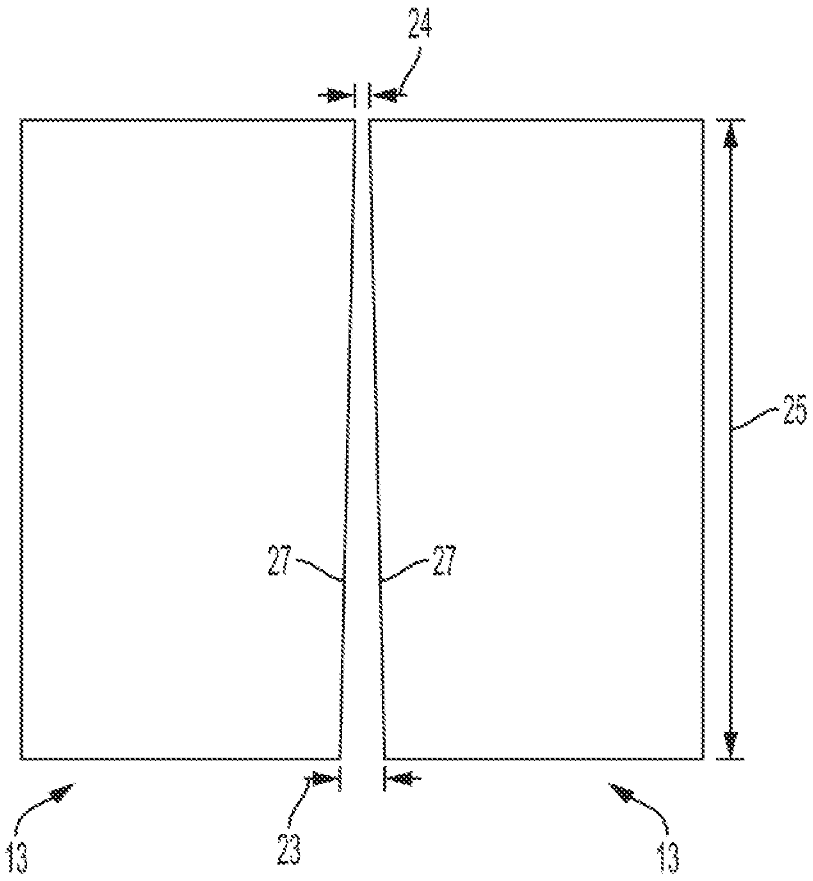
FIG. 14 illustrates excessive gaps at meeting edges of a pair of doors.
Figure 15:
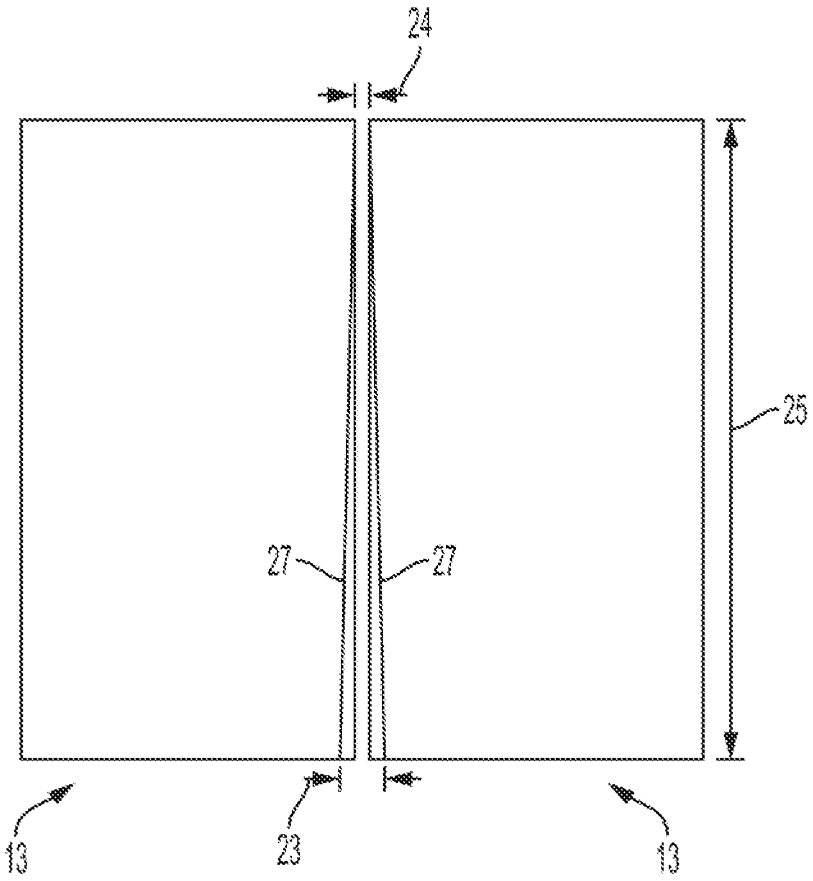
FIG. 15 illustrates correcting the excessive gaps of FIG. 14 using the formed metal edge of FIG. 4, according to an exemplary aspect of the present disclosure.

Referring to FIG. 14, the present disclosure may be configured to correct an excessive gap at the meeting edges of a pair of doors. For example, a pair of doors may include two single swing fire rated doors 13 illustrated in e.g., FIG. 13, each hinged on one side and attached to a door frame, where the side opposite the hinges may be referred to as the meeting edges 27. Pursuant to relevant regulation code, the allowable gap between the meeting edges 27 is ⅛". As shown in FIG. 14, the excessive gap may vary along the height 25 of the fire rated doors 13, resulting in a condition whereby the dimension 24 at the top of the meeting edges 27 may be either greater or less than the dimension 23 at the bottom of the meeting edges 27. For example, the dimension 24 may measure 0.19" and the dimension 23 may measure 0.38". As described above, this gap variation requires that the formed metal edge 1 be modified to accommodate the variance, as shown in FIG. 15.

In another embodiment, the present disclosure may be used to remedy the excessive gap condition by at least applying the formed metal edge 1 of FIG. 4 to a door frame rather than to the fire rate door as previously described. The method and apparatus of application may be the same when either applied to a fire rated door, or to a door frame.

Further, in accordance with other aspects of the present disclosure, a fire-rated door assembly may contain a listed and labeled fire rated frame, two listed and labeled fire rated swinging doors and a listed and labeled fire rated smoke seal gasket set. In some embodiment, excessive clearance gaps around the perimeter of the door may be corrected by using a stop extender, attached to the frame. When an assembly containing a pair of doors is compliant around the perimeter but non-compliant at the meeting edges of the two doors (e.g., FIG. 14), the present disclosure provides a solution. Regarding the gap at the meeting edges, a few elements factor into the effectiveness of the disclosed method and apparatus. While there can exist an excessive gap between the doors, the excessive gap may not be uniform along the height of the doors. Furthermore, the listed and labeled fire rated doors may be wood-composite (commonly containing a mineral-based core) or a hollow metal, steel door. Therefore, the disclosed method and apparatus may account for these variations while providing for an aesthetic and practical solution.

One of the preferred embodiments may include a formed metal edge sheet metal part, made from 20 gauge cold rolled steel. The geometry of the formed metal edge may be similar to that of FIGS. 4, 5A, 5B, 6A, 6B, 7A and 7B described above, creating the ability for the metal edge to be modified or flattened as needed with respect to the excessive gap and the edge of the doors. In one embodiment, the formed metal edge 1 of FIG. 4 may be a solution for both wood-composite and metal fire rated doors. The formed metal edge 1 of the present disclosure may be aesthetically pleasing with an appearance similar to other door edges found with within application on architectural wood door as well as hollow metal, steel doors. In addition to the formed metal edge 1, fire-rated caulk may be used between the concave side (e.g., portion 26 illustrated in FIGS. 5A, 5B, 6A, 6B, 7A and 7B) of the formed metal edge 1 and the edge of the door. Lastly, mechanical fasteners (e.g., mechanical fasteners 15 of FIGS. 10A and 10B) may be used to secure the formed metal edge 1 to the edge of the door. When the fire-rated caulk has fully cured, both the mechanical fasteners and the fire-rated caulk may serve as a system to secure the formed metal edge 1. Additionally, the cured fire-rated caulk may be configured to provide rigidity and integrity to the formed metal edge 1 of the present disclosure, thereby preventing damage and unwanted visual dents and dings during the use of the doors. Upon installation, the formed metal edge 1 and fasteners 15 may be painted to match the original manufactured condition of the fire-rated door assembly.

One important feature of the preferred embodiment is that the formed metal edge 1 may vary in overall thickness across the full height of a door or doors to be repaired for excessive perimeter gaps. In one example, the gap between the doors at the top may be ⅛", the gap at the bottom of the doors ⅜". Per NFPA 80, the gap at the top of the doors is compliant, but at the bottom the gap is non-compliant. The formed metal edge 1 of the present disclosure may be applied to correct this non-compliant gap, and installed to compensate for the variance, by pulling down, or flattening the formed metal edge 1. The manufactured thickness of one preferred embodiment is ¼". Therefore, the thickness may be reduced by flattening the geometry of the formed metal edge 1 at the top of the doors while remaining the original thickness at the bottom of the doors. The flattening of the geometry at any point along the formed metal edge 1 may be performed by simply using the mechanical fasteners or by using a wood block and hammer to strike as/where needed to match-fit the gap.

One additional important feature of the present disclosure is the balance between the overall thickness dimension, as previously described, and the overall width dimension. That is, when the overall thickness dimension of the formed metal edge 1 is at the minimum possible dimension based on geometry and material thickness, the overall width dimension of the formed metal edge may remain less than the thickness dimension of a door edge. Most typically, fire rated doors measure 1¾" in overall thickness. Therefore, when the formed metal edge 1 is at the minimum overall thickness dimension (i.e., fully flattened condition), the maximum overall width dimension of the formed metal edge 1 does not exceed the edge thickness of the door. This is for both safety and aesthetic reasons.

Yet another important feature of the present disclosure is an anchoring system used for attachment to a wood-composite fire-rated door. Wood-composite fire rated doors typically contain a mineral-based core material. In addition, the stile and rail material are commonly mineral-based. The importance of this material lies in the fact that it can become brittle and/or compromised during the extreme furnace conditions during the UL10(C) fire test, which may reach nearly 1800° F. after 90 minutes. Immediately following this endurance test is a hose-stream test, whereby the tested door is subjected to a harsh stream of water from a fire-hose nozzle. The mechanical impact coupled with the thermal shock of this part of the test is challenging to overcome. The core material reacts differently than the formed metal edge material. Therefore, the anchoring system of the present disclosure may be configured to provide integrity required to pass the UL10(C) fire test. An example anchoring system may include boring ½" diameter holes to a depth of 1½" along the edge of the door where the formed metal edge 1 may be applied. The spacing of these bores matches the spacing of the mechanical fasteners, approximately 8" on center. To execute the anchoring system, the bores may be filled with fire rated caulk, which contacts the fire rated caulk on the concave side (portion 26 of FIGS. 5A, 5B, 6A, 6B, 7A and 7B) of the formed metal edge. #10×2½" long mechanical fasteners may be driven into the mineral-based material, through the bore filled with fire rated caulk to secure the formed metal edge. When the fire rated caulk cures, a contiguous body is created, hereby referred to as the anchoring system of the present disclosure.

Among other features, a method of attachment for listed and labeled fire-rated wood doors in accordance with aspects of the present disclosure may include the following:

1. Determine excessive gap dimension between pairs of doors. As the formed metal edge of the present disclosure can be drawn down during installation to accommodate an uneven excessive gap, take care to note the location and dimension of correction needed, before installation.
2. Place the formed metal edge (e.g., formed metal edge 1 of FIG. 4) against edge of door and transfer hole locations from metal edge onto edge of door, as well as mark for proper height (cutting as necessary).
3. Place masking tape on face of door, on both sides of edge to be corrected.
4. Drill pilot holes 7⁄64" diameter×2½" deep at hole locations.
5. Install formed metal edge using #10×¾" stainless screws to draw-down the metal edge to the appropriate gap clearance thickness. Before removing the formed metal edge, mark the top of the metal edge for a later step.

6. Remove the screws and the formed metal edge.
7. Drill anchor holes h" diameter×1½" deep at hole locations.
8. Remove dust and debris from holes.
9. Place the formed metal edge on a horizontal support with the concave side facing up. Place fire rated caulk inside the concave side of the formed metal edge, running full length. If desired, strike level with edge of formed metal edge using a trowel or putty knife. Let formed metal edge with fire-rated caulk set in horizontal position until next step is complete.
10. Using fire-rated caulk, fill each of the ½" diameter holes (e.g., FIG. 10B).
11. Locate the top marking on formed metal edge. Place formed metal edge with top of formed metal edge at top of door. Using #10×2½" stainless steel screws, attach the formed metal edge to the door at all hole locations.
12. Clean any excess fire-rated caulk from formed metal edge and face of door using soap and water.
13. Remove masking tape from both faces of door and wipe clean.
14. Allow fire-rated caulk to cure for 24 hours prior to painting or additional aesthetics.

Among other features, an example method of attachment for listed and labeled hollow metal, steel doors in accordance with aspects of the present disclosure may include the following:

1. Determine excessive gap dimension between pairs of doors. As the formed metal edge of the present disclosure can be drawn down during installation to accommodate an uneven excessive gap, take care to note the location and dimension of correction needed, before installation.
2. Place masking tape on face of door, on both sides of edge to be corrected.
3. Place the formed metal edge (e.g., formed metal edge 1 of FIG. 4) against edge of door, mark for proper height and cut as necessary.
4. Place the formed metal edge on a horizontal support with the concave side (portion 26 of FIGS. 5A, 5B, 6A, 6B, 7A and 7B) facing up. Place fire-rated caulk inside the concave side of the metal edge, running full length. If desired, strike level with edge of formed metal edge using a trowel or putty knife.
5. Install the formed metal edge using #10×¾" TEK stainless screws to draw-down the metal edge to the appropriate gap clearance thickness.
6. Clean any excess fire-rated caulk from metal edge and face of door using soap and water.
7. Remove masking tape from both faces of door and wipe clean.
8. Allow fire-rated caulk to cure for 24 hours prior to painting or additional aesthetics.

The present disclosure may be used to correct a non-compliant, excessive gap condition between a door and a frame; correct a non-compliant, excessive gap condition between a pair of doors at the meeting edge; correct a non-compliant, excessive gap condition using a formed metal edge and mechanical fasteners; and correct a non-compliant, excessive gap condition using a formed metal edge and mechanical fasteners, whereby the formed metal edge may vary in dimensions at different locations in order to accommodate variation in gaps (e.g., uneven gaps at different locations). Further, in one embodiment, the present disclosure may be used to correct a non-compliant, excessive gap condition using a formed metal edge and mechanical fasteners, whereby the formed metal edge may vary in overall thickness within the same part, and at the minimum thickness condition, the width of the formed metal edge remains equal to or less than the door thickness. In another embodiment, the present disclosure may be used to correct a non-compliant, excessive gap condition using a formed metal edge in combination with mechanical fasteners and fire rated caulk; and correct a non-compliant, excessive gap condition using a formed metal edge in combination with mechanical fasteners and fire rated caulk, whereby the fire rated caulk may be compliant to the variation in geometry of the formed metal edge upon installation.

In addition, the present disclosure may be used to correct a non-compliant, excessive gap condition using a formed metal edge in combination with mechanical fasteners, fire rated caulk and an anchoring system. The anchoring system being filled with fire rated caulk such that the fire rated caulk of the anchoring system contacts the fire rated caulk applied to the concave side of the formed metal edge. Upon full cure of the fire rated caulk, the fire rated caulk in both the anchoring system and the concave side of the formed metal edge become a contiguous body.

It should be appreciated that, the formed metal edge 1 of the present disclosure may be an integral piece as shown in FIG. 4 or may be composed of two or more pieces. In one embodiment, the formed metal edge 1 may include two pieces that may be symmetrical along the centerline 34 of FIG. 4 and may be positioned adjacent to each other during use. In another embodiment, the formed metal edge 1 may include two pieces that may be configured to overlap each other in certain portions during use (e.g., the central portions including the holes 3 may be overlapped). In these alternative embodiments, additional fasteners may be needed to secure each of the two pieces to the door independently, or, the two pieces may need to overlap each other to use the fasteners (e.g., mechanical fasteners 15) described above.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. An assembly for controlling and managing a door perimeter clearance of a door, the assembly comprising:

a horizontal portion including a center portion configured to secure the assembly along a vertical edge of at least one of the door or a door frame adjacent the door;

a first leg portion connected to the horizontal portion at a first angle at a first distal end of the horizontal portion; and a second leg portion connected to the horizontal portion at a second angle at a second distal end of the horizontal portion, wherein the first and second angles are independently adjusted to change a width and a height of the assembly in order to maintain the door perimeter clearance of the door in accordance with a selected distance, wherein the width of the assembly is less than or equal to a width of the vertical edge of the door when the assembly is secured to the vertical edge of the at least one of the door or the door frame adjacent the door.

2. The assembly of claim 1, wherein one or both the first and second angles are enlarged to increase the width of the assembly while reducing the height of the assembly in order to accommodate different widths and configurations of the vertical edge of the at least one of the door or the door frame adjacent the door at different portions.

3. The assembly of claim 1, wherein one or both the first and second angles are reduced to reduce the width of the assembly while increasing the height of the assembly in order to accommodate different widths and configurations of the vertical edge of the at least one of the door or the door frame adjacent the door at different portions.

4. The assembly of claim 1, wherein the door is one of a pair of doors with the vertical edge as one of a pair of meeting edges of the pair of doors.

5. The assembly of claim 4, wherein the assembly is secured to the vertical edge of another door of the pair of doors such that the distance between corresponding horizontal portions of both doors complies with the selected distance.

6. An assembly for controlling and managing a door perimeter clearance of a door, the assembly comprising:

a horizontal portion including a center portion configured to secure the assembly along a vertical edge of at least one of the door or a door frame adjacent the door;

a first leg portion connected to the horizontal portion at a first angle at a first distal end of the horizontal portion; and a second leg portion connected to the horizontal portion at a second angle at a second distal end of the horizontal portion, wherein the first and second angles are independently adjusted to change a width and a height of the assembly in order to maintain the door perimeter clearance of the door in accordance with a selected distance, wherein the center portion of the horizontal portion is configured to receive a plurality of attachment components for securing the assembly along the vertical edge of the at least one of the door or the door frame adjacent the door via a plurality of bores implemented on the vertical.

7. The assembly of claim 6, wherein the plurality of bores are filled with fire-rated caulk.

8. The assembly of claim 6, wherein the assembly and the vertical edge are configured to form a space for holding fire-rated caulk.

9. A method for controlling and managing a door perimeter clearance of a door, the method comprising:

securing an assembly along a vertical edge of at least one of the door or a door frame adjacent the door, wherein the assembly includes: a horizontal portion having a center portion, a first leg portion connected to the horizontal portion at a first angle at a first distal end of the horizontal portion, and a second leg portion connected to the horizontal portion at a second angle at a second distal end of the horizontal portion; and independently adjusting the first and second angles to change a width and a height of the assembly in order to maintain the door perimeter clearance of the door in accordance with a selected distance, wherein the width of the assembly is less than or equal to a width of the selected edge of the door when the assembly is secured to the vertical edge of the at least one of the door or the door frame adjacent the door.

10. The method of claim 9, further comprising:

implementing a plurality of bores on the vertical edge of the at least one of the door or the door frame adjacent the door;

inserting a plurality of attachment components through the center portion of the horizontal portion and the plurality of bores; and securing the assembly to the vertical edge of the at least one of the door or the door frame adjacent the door via the plurality of attachment components.

11. The method of claim 10, further comprising filling the plurality of bores with fire-rated caulk.

12. The method of claim 10, further comprising applying fire-rated caulk in a space formed by the assembly and the vertical edge.

13. The method of claim 9, further comprising enlarging one or both the first and second angles to increase the width of the assembly while reducing the height of the assembly in order to accommodate different widths and configurations of the vertical edge of the at least one of the door or the door frame adjacent the door at different portions.

14. The method of claim 9, further comprising reducing one or both the first and second angles to reduce the width of the assembly while increasing the height of the assembly in order to accommodate different widths and configurations of the vertical edge of the at least one of the door or the door frame adjacent the door at different portions.

15. The method of claim 9, wherein the door is one of a pair of doors with the vertical edge as one of a pair of meeting edges of the pair of doors.

16. The method of claim 15, further comprising securing the assembly to the vertical edge of another door of the pair of doors such that the distance between corresponding horizontal portions of both doors complies with the selected distance.

* * * * *